United States Patent
Rodriguez et al.

(10) Patent No.: US 9,303,523 B2
(45) Date of Patent: Apr. 5, 2016

(54) SENSOR COMMUNICATION SYSTEM AND MACHINE HAVING THE SAME

(75) Inventors: Rigoberto Rodriguez, Avon, IN (US); Mark Blackwelder, Plainfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1043 days.

(21) Appl. No.: 13/153,223

(22) Filed: Jun. 3, 2011

(65) Prior Publication Data

US 2012/0079830 A1    Apr. 5, 2012

Related U.S. Application Data

(60) Provisional application No. 61/350,963, filed on Jun. 3, 2010.

(51) Int. Cl.
*F01D 17/02* (2006.01)
*F01D 17/20* (2006.01)
(Continued)

(52) U.S. Cl.
CPC ............... *F01D 17/02* (2013.01); *F01D 17/20* (2013.01); *F01D 25/162* (2013.01); *F01D 17/085* (2013.01); *F23M 11/045* (2013.01); *H04Q 9/00* (2013.01); *Y02T 50/671* (2013.01)

(58) Field of Classification Search
CPC ..... F01D 21/003; F01D 17/02; F01D 17/085; F23M 11/045; F23M 11/047; H04Q 9/00; H04Q 9/02; H04Q 9/04; H04Q 9/08; H04Q 9/10; H04Q 9/12; H04Q 9/14; H04Q 9/16

USPC .......... 60/772, 803, 734; 340/870.01, 870.02, 340/870.07, 870.16, 870.17, 870.3
See application file for complete search history.

(56) References Cited

U.S. PATENT DOCUMENTS 3,705,775 A * 12/1972 Rioux ............................ 417/411
5,069,070 A * 12/1991 Schmitz ......................... 73/597
(Continued)

FOREIGN PATENT DOCUMENTS

EP          1916868 A2    4/2008
WO       2008091289 A2    7/2008

OTHER PUBLICATIONS

Supplementary European Search Report in corresponding European application (i.e., EP 11 79 0510), mailed May 23, 2014 (10 pages).
(Continued)

*Primary Examiner* — Phutthiwat Wongwian
*Assistant Examiner* — Michael B Mantyla
(74) *Attorney, Agent, or Firm* — Shumaker & Sieffert, P.A.

(57) ABSTRACT

A sensor communication system includes an electromagnetic waveguide disposed adjacent to at least one component of a machine. The electromagnetic waveguide can be configured to convey a fluid within the machine. The sensor communication system can also include a sensor assembly, which includes a sensor operable to sense at least one condition and a transmitter at least partially positioned in the electromagnetic waveguide. The transmitter can be operatively coupled to the sensor and be operable to emit a signal corresponding to the at least one condition sensed by the sensor. The sensor communication system can also include a receiver at least partially positioned in the electromagnetic waveguide and operable to wirelessly receive the signal emitted by the transmitter.

15 Claims, 3 Drawing Sheets

(51) Int. Cl.
*F01D 25/16* (2006.01)
*F01D 17/08* (2006.01)
*F23M 11/04* (2006.01)
*H04Q 9/00* (2006.01)

(56) References Cited

U.S. PATENT DOCUMENTS

| | | | | |
|---|---|---|---|---|
| 5,103,181 A | * | 4/1992 | Gaisford et al. | 324/637 |
| 5,120,975 A | * | 6/1992 | Fedor et al. | 250/554 |
| 5,351,521 A | * | 10/1994 | Cracknell | 73/19.1 |
| 5,845,480 A | * | 12/1998 | DeFreitas et al. | 60/776 |
| 6,012,915 A | * | 1/2000 | Mori et al. | 431/4 |
| 6,189,510 B1 | * | 2/2001 | Jaeger et al. | 123/468 |
| 6,642,720 B2 | | 11/2003 | Maylotte et al. | |
| 6,775,986 B2 | * | 8/2004 | Ganz et al. | 60/773 |
| 6,820,431 B2 | * | 11/2004 | McManus et al. | 60/776 |
| 7,017,415 B2 | * | 3/2006 | Harrold et al. | 73/702 |
| 7,231,180 B2 | | 6/2007 | Benson et al. | |
| 7,634,913 B2 | * | 12/2009 | Singh et al. | 60/772 |
| 7,688,081 B2 | * | 3/2010 | Webster | 324/662 |
| 7,854,127 B2 | * | 12/2010 | Brown | 60/803 |
| 7,890,293 B2 | * | 2/2011 | Bosselmann et al. | 702/159 |
| 7,969,165 B2 | * | 6/2011 | Bosselmann et al. | 324/644 |
| 2003/0094956 A1 | | 5/2003 | Orenstein | |
| 2004/0177694 A1 | | 9/2004 | Harrold et al. | |
| 2005/0213548 A1 | | 9/2005 | Benson et al. | |
| 2008/0054645 A1 | | 3/2008 | Kulkarni et al. | |
| 2008/0125950 A1 | | 5/2008 | Brown | |
| 2009/0128166 A1 | | 5/2009 | Webster | |
| 2010/0115957 A1 | | 5/2010 | Labala | |
| 2011/0084171 A1 | * | 4/2011 | Lam et al. | 244/134 D |

OTHER PUBLICATIONS

International Search Report and Written Opinion, PCT/US2011/039167, International Searching Authority/US, Rolls-Royce Corporation, Oct. 11, 2011.

\* cited by examiner

SENSOR COMMUNICATION SYSTEM AND MACHINE HAVING THE SAME

CROSS-REFERENCE TO RELATED APPLICATIONS

This application claims the benefit of U.S. Provisional Application No. 61/350,963, filed Jun. 3, 2010, which is incorporated herein by reference in its entirety.

BACKGROUND

Embodiments of disclosed herein relate generally to sensors for machines and, more particularly, to a wireless sensor for sensing a condition existing within an engine.

Modern physical systems, such as those used in aircraft, are becoming more and more complex. This increase in system complexity has led to an increased desire for automated prognostic and health monitoring systems. Many prognostic and health monitoring systems receive signals or data representative of one or more physical parameters from various components and/or subsystems within a system. The prognostic and health monitoring systems may then use the signals or data to, for example, predict future system performance and/or detect or predict potential component or subsystem faults.

One particular aircraft system in which prognosis and health monitoring capability is becoming increasingly desirable is aircraft engine systems. To provide such capability, however, several sensors of varying types may be mounted on the engine to sense various physical parameters associated with engine operation. These sensors may be coupled to a central processing unit such as, for example, a Full Authority Digital Engine Controller (FADEC) using wiring and multiple wiring harnesses. These wiring and wiring harnesses used to couple the sensors to the central processing unit can increase overall system weight and cost, and can reduce overall system reliability.

Hence, there is a need for a system and method of providing signals and/or data representative of various conditions within an engine that do not use wiring and multiple wiring harnesses and/or reduce the overall impact on system weight and cost and/or does not reduce overall system reliability.

SUMMARY

One embodiment of the present invention is a unique sensor communication system for wirelessly communicating data. Other embodiments include unique methods, systems, devices, and apparatus to sense at least one condition within a machine and wirelessly communicate data corresponding to the condition. Further embodiments, forms, objects, aspects, benefits, features, and advantages of the present invention shall become apparent from the figures and description provided herewith.

DETAILED DESCRIPTION OF THE ILLUSTRATED EMBODIMENTS

Embodiments of the present invention, examples of which are described below, can be applied to enhance the quality of wireless data transmission in harsh operating environments, such as an engine. In some instances, wireless data transmission can be desirable to eliminate the material and labor costs associated with wiring. However, wireless data transmission can be challenging in operating environments where a sensor is encased or surrounded by a structure formed from electrically conductive material. Often such structures desirably contain fluid pressures and temperatures arising from the operation of the engine. However, these structures can significantly attenuate a radio frequency signal such that it is no longer effective for communication.

Machines such as a engines (e.g., reciprocating engines, turbine engines, or the like) generally include a primary fluid passageway through which a first fluid stream passes. At least one combustion chamber is positioned along the primary fluid passageway. The first fluid stream is manipulated during passage through the primary fluid passageway to generate power. For example, the first fluid stream can be compressed, combined with fuel, and burned.

Engines also generally include secondary passageways to support operation of the engine and thus support the generation of power. These secondary passageways can, by way of example and not limitation, direct the flow of lubricant, fuel, cooling fluid. A secondary passageway can also be applied to direct exhaust from the engine.

As will be demonstrated below by example, embodiments of the present invention provide an engine having a wireless sensor in which the wireless transmission of data is directed through a secondary passageway. When wireless data transmission is accomplished, the material and labor costs associated with wired communications can be eliminated. Embodiments of the invention also overcome a challenge posed in some operating environments wherein the sensor is encased or surrounded by a structure formed from conductive material. For example, existing passageways can be used to communicate data.

Figure 1:
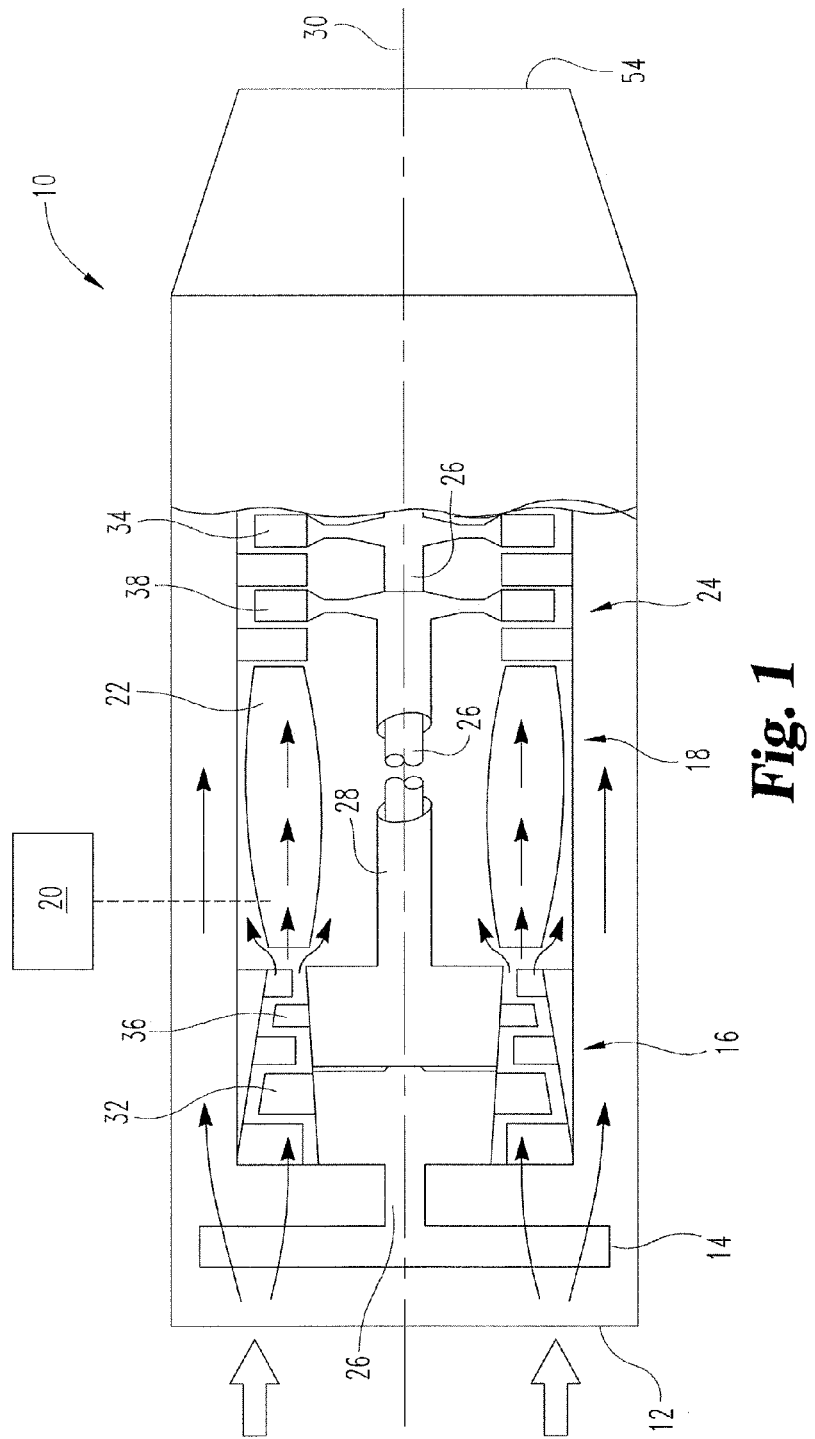
FIG. 1 is a schematic view of a turbine engine.

FIG. 1 is a schematic view of a turbine engine 10. The various unnumbered arrows illustrated in FIG. 1 represent the direction of fluid flow through the turbine engine 10. The turbine engine 10 can produce power for several different kinds of applications, including vehicle propulsion and power generation, among others. It will be appreciated that the turbine engine 10 can be provided in any configuration, and can be used in any application. Also, embodiments of the present invention can be implemented with other types of engines such as reciprocating engines.

As exemplarily shown, the turbine engine 10 can include an inlet 12 with a fan 14 to receive fluid such as air. In an alternative embodiment, the fan 14 may be omitted from the turbine engine 10. The turbine engine 10 can also include a compressor section 16 to receive the fluid from the inlet 12 and compress the fluid. The turbine engine 10 can also include a combustor section 18 to receive the compressed fluid from the compressor section 16. The compressed fluid can be mixed with fuel from a fuel system 20 and ignited in a combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about a centerline axis 30 of the turbine engine 10. Although only two shafts 26, 28 are shown, it will be appreciated that any number of shafts may be included within the turbine engine 10. The shafts 26, 28 can be journaled together for relative rotation. The shaft 26 can be a low pressure shaft supporting compressor blades 32 of a low pressure portion of the compressor section 16. The shaft 26 can also support low pressure turbine blades 34 of a low pressure portion of the turbine section 24.

The shaft 28 encircles the shaft 26. Bearings (not shown) can be disposed between the shafts 26, 28. The shaft 28 can be a high pressure shaft supporting compressor blades 36 of a high pressure portion of the compressor section 16. The shaft 28 can also support high pressure turbine blades 38 of a high pressure portion of the turbine section 24.

The turbine engine 10 defines a first fluid passageway (also referred to herein as a "primary fluid passageway"), extending along the axis 30 from the inlet 12 to an outlet 54. The exemplary first fluid passageway is defined in part by the compressor section 16 and the combustor section 18 and the turbine section 22. The first fluid passageway directs a first fluid stream through a core of the turbine engine 10. The first fluid stream can be air at the inlet 12 and through the compressor section 16. The first fluid stream can be a mixture of air and fuel in the combustor section 18. The first fluid stream can be exhaust gases through the turbine section 24 and the outlet in the exemplary embodiment of the invention.

Figure 2:
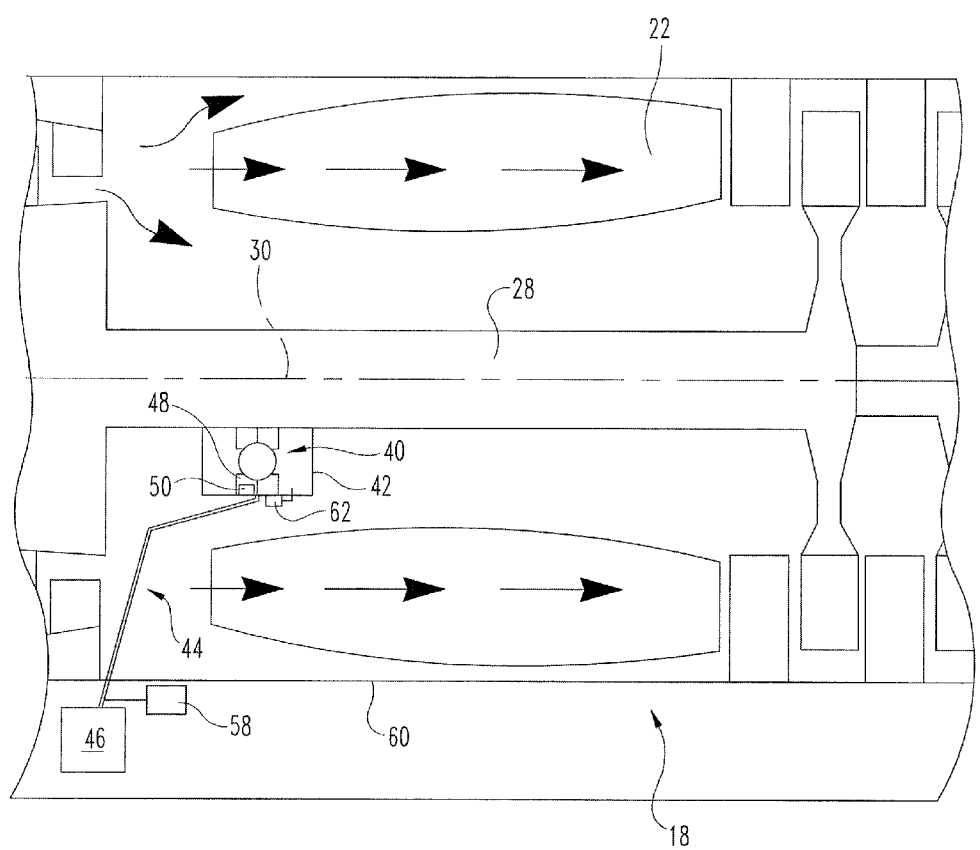
FIG. 2 is a magnified schematic view of a combustor section of the turbine engine shown in FIG. 1.
Figure 3:
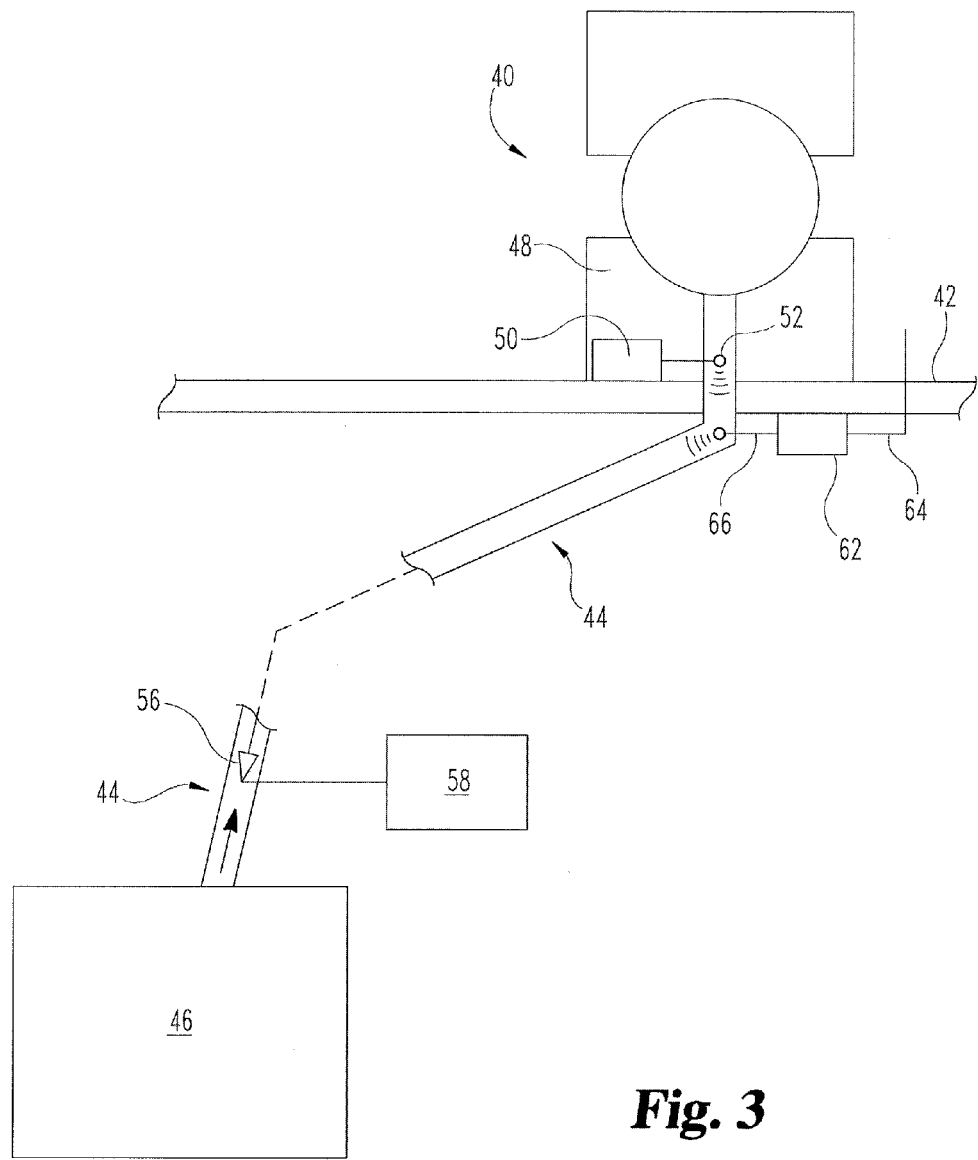
FIG. 3 is a magnified schematic view of the communications system shown in FIG. 2.

FIG. 2 is a magnified schematic view of a combustor section of the turbine engine shown in FIG. 1. FIG. 3 is a magnified schematic view of the communications system shown in FIG. 2.

Referring to FIG. 2, a support member, such as bearing 40, can support the shaft 28 for rotation and be positioned in a sump housing 42. The position of the bearing 40 along the axis 30 is selected for illustrative purposes only, and it will be appreciated that the bearing 40 can be positioned anywhere along the axis 30. It will also be appreciated that the support member can be any suitable mechanism or structure provided in addition to, or as an alternative to, the bearing 40. The exemplary bearing 40 and sump housing 42 are shown on one side of the shaft 28 to simplify the illustration. In practice, the bearing 40 and sump housing 42 can encircle the shaft 28. The sump housing 42 can seal against the shaft 28.

The bearing 40 can receive a fluid such as a lubricant through a second fluid passageway 44 (also referred to herein as a "secondary fluid passageway"). The second fluid passageway 44 can extend from a lubricant pump 46 to an outer race 48 of the bearing 40. Thus, the second fluid passageway 44 is disposed adjacent to the lubricant pump 46 and the outer race 48 of bearing 40. As a result, the second fluid passageway 44 can direct the lubricant from the lubricant pump 46 to the bearing 40. The lubricant pump 46 can receive lubricant from a lubricant tank (not shown) and/or can be part of a re-circulating lubricant system.

Referring to FIGS. 2 and 3, a sensor 50 can be coupled to the bearing 40. The sensor 50 can be substantially encased and/or substantially encircled by a casing 60 formed of conductive material. The exemplary sensor 50 can be operable to sense at least one condition. For example, the sensor 50 can be a vibration sensor for sensing the condition of the level of vibration of the bearing 40. The exemplary sensor 50 can be embedded in an outer race 48 of the bearing 40 (as illustrated), or can be fixed to an outer surface of the outer race 48.

As shown in FIG. 3, the sensor 50 can be a part of a sensor assembly that also includes a transmitter 52 coupled to the sensor 50. The transmitter 52 can be operable to emit a signal corresponding to the at least one condition sensed by the sensor 50. At least a portion of the exemplary transmitter 52 can be disposed in the second fluid passageway 44 to emit the signal in the second fluid passageway 44 and through fluid that is disposed in the second fluid passageway 44. A receiver 56 operable to receive the signal emitted by the transmitter 52 can also be positioned in the second fluid passageway 44. The receiver 56 can be an antenna such as a microwave horn antenna or some other structure operable to capture a wireless signal. The receiver 56 can communicate with a data storage device and/or processor (generically identified at 58) so that the at least one condition sensed by the sensor 50 can be stored, monitored, evaluated, and/or processed appropriately. The data storage device and/or processor 58 can be located outside the turbine engine 10 or inside the turbine engine 10 and can communicate with the receiver 56 by way of a wired connection. Data communicated by the transmitter 52, which corresponds to the at least one condition sensed by the sensor 50, can be used for prognostics, health management, maintenance scheduling, fault identification and tolerance, research and design.

The data storage device can include one or more components and can be of any volatile or nonvolatile type, including the solid state variety, the optical media variety, the magnetic variety, any combination of these, or such different arrangement as would occur to those skilled in the art. The processor may be configured to execute operating logic defining various prognostics, health management, maintenance scheduling, fault identification and tolerance, research and design functions. This operating logic may be in the form of dedicated hardware, such as a hardwired state machine, programming instructions, and/or a different form as would occur to those skilled in the art. The processor may be provided as a single component, or a collection of operatively coupled components; and may be comprised of digital circuitry, analog circuitry, or a hybrid combination of both of these types. When of a multi-component form, the processor may have one or more components remotely located relative to the others. The processor can include multiple processing units arranged to operate independently, in a pipeline processing arrangement, in a parallel processing arrangement, and/or such different arrangement as would occur to those skilled in the art. In one embodiment, the processor is a programmable microprocessing device of a solid-state, integrated circuit type that includes one or more processing units and memory. The processor can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art.

As exemplarily described above, signals can be wirelessly transmitted from the transmitter 52 of sensor assembly to the receiver 56 via the second fluid passageway 44, through lubricant that is disposed in the second fluid passageway 44. Thus, the exemplary second fluid passageway 44 can be used to direct lubricant (e.g., oil) to the bearing 40 and direct wireless signals away from a sensor assembly without interference by the casing 60. Exemplary types of oils that may be directed within the second fluid passageway 44 include hydrocarbon oil, polyalphaolefin (PAO) oil, or the like. In other embodiments, the transmitter 52 can be configured to wirelessly communicate to the receiver 56 through other secondary fluid passageways that convey other types of fluids. By way of example and not limitation, other passageways can convey other types of fluids such as fuel, coolant (e.g., liquid coolant, chemical coolant, gaseous cooling air, or the like), or the like. The suitability of a particular secondary fluid passageway for directing wireless signals can be assessed based on the fluid disposed within the particular passageway. For example, a fluid such as water may detract from the suitability of a particular secondary fluid passageway for directing the wireless signal.

As exemplarily illustrated, fluid within the second fluid passageway 44 does not enter into the first fluid passageway. Therefore, the second fluid passageway 44 does not communicate with the first fluid passageway and is distinct from the first fluid passageway. In other embodiments, however, secondary fluid passageways can be less than fully distinct from the primary fluid passageway. For example, in one embodiment, the secondary fluid passageway can be a bleed from the compressor section 16 shown in FIG. 1. In another example embodiment, the secondary fluid passageway can be an exhaust passageway downstream of one or more cylinders (i.e., primary fluid passageways) of a reciprocating engine.

The exemplary second fluid passageway 44 is shown in FIGS. 2 and 3 as extending along a torturous path, including two relatively sharp changes in directions. The second fluid passageway 44 is also shown as extending axially and radially relative to a centerline axis 30 of the turbine engine 10. Thus, in the embodiment exemplarily illustrated in FIGS. 2 and 3, a signal emitted by the transmitter 52 travels to the receiver 56 along a distance greater than the shortest distance between the transmitter 52 and the receiver 56. In one embodiment, cross-sectional dimensions of the second fluid passageway 44 (e.g., when viewed in along a longitudinal axis of the passageway) can be constant along at least part of its length. In another embodiment, cross-sectional dimensions of the second fluid passageway 44 can be variable along at least part of its length.

In one embodiment, the transmitter 52 can be operable to emit a signal at a frequency that is substantially optimized relative to the cross sectional dimensions of the second fluid passageway 44 such that the second fluid passageway 44 functions as an electromagnetic waveguide. As used herein, an "electromagnetic waveguide" or more simply "waveguide" refers to a structure such as a hollow metal conductor that provides a path along which electromagnetic signals having one or more frequencies (e.g., a radio frequency, a microwave frequency, or the like or a combination thereof) can be transmitted. In one embodiment, the frequency of the signal emitted by the transmitter 52 can be selected based on the dimensions of the second fluid passageway 44 and the material from which the second fluid passageway 44 is formed. In another embodiment, the dimensions of the second fluid passageway 44, and the material from which the second fluid passageway 44 is formed, can be selected based on the frequency signal emitted by the transmitter 52. Accordingly, the second fluid passageway 44 can support any mode of signal transmission, and can also support multiple modes of signal coupling and transmission (e.g., electric field mode and/or magnetic field mode). It will be appreciated that numerous reference sources are available to one of ordinary skill in the art that correlate frequency, waveguide dimensions and waveguide material in order to successfully transmit a signal through a waveguide.

In one embodiment, the second fluid passageway 44 can have a circular cross-sectional dimension, a rectangular cross-sectional, or the like, or a combination thereof. According to some embodiment, the shape of the cross-sectional dimension of the second fluid passageway 44 can be variable or constant along at least a portion of the length of the second fluid passageway 44.

Rectangular waveguides can be specified in WR numbers. The "WR" stands for "rectangular waveguide" and the number that follows is the dimension of the broad wall in mils, divided by 10. One mode of transmission in a rectangular waveguide is referenced as TE01. The lower cutoff wavelength and frequency for the TE01 mode is generally:

$\lambda_{Lower\ Cutoff} = 2 \cdot a$, where "a" is the dimension of the broad wall of the rectangular wave guide; and $F_{Lower\ Cutoff} = (c)/(2 \cdot a)$, where "c" is the speed of light. The upper cutoff frequency is one octave above the lower such that the interval between the two frequencies (as in an electromagnetic spectrum) has a ratio of 2 to 1.

Generally, the limits of operation for a rectangular waveguide are (approximately) between 125% and 189% of the lower cutoff frequency. Thus for WR-90, the cut-off is 6.557 GHz, and the accepted band of operation is 8.2 to 12.4 GHz.

The selection of the signal frequency is not compromised by how the secondary fluid passageway is shaped or how it bends. Also a secondary fluid passageway having a particular cross-sectional dimension may be suitable for transmitting signals at multiple frequencies.

The second fluid passageway 44 can be formed from any suitable material. In one embodiment, the second fluid passageway 44 is formed from copper, aluminum, silver, or the like, or a combination thereof. In another embodiment, the second fluid passageway 44 can be formed with silver plating on an interior surface thereof to decrease resistance loss.

As described above, the sensor 50 can be provided as a vibration sensor configured to sense a single condition such as vibration of the bearing 40. Nevertheless, the sensor 50 can be any suitable sensor configured to sense one or more conditions. For example, the sensor 50 can be configured to sense one or more conditions such as temperature, strain, stress, torque, speed, voltage, current, force, flow, pressure, luminescence, color, image, displacement, radiation, or the like or a combination thereof.

As described above, the sensor 50 can be configured to sense a condition (i.e., vibration) that is not related directly to (i.e., is independent of, or is not a condition of) the fluid within the second fluid passageway 44. Nevertheless, the sensor 50 can be configured to sense one or more conditions that are related to the fluid within the second fluid passageway 44. For example, the sensor 50 can be configured to sense one or more conditions such as a temperature of the fluid within the second fluid passageway 44, a pressure of the fluid within the second fluid passageway 44, or the like, or a combination thereof.

In one embodiment, one or more of the components of the sensor assembly can be self-powered. Thus, the sensor 50 and/or the transmitter 52 can be self-powered. Energy scavenging methods, such as thermo-electric conversion, can be applied to trickle charge an energy storage device (capacitor or battery) associated with the sensor 50 and/or the transmitter 52. Other powering devices for powering the sensor 50 and/or the transmitter 52 can include micro-generators, thermal electric generators, piezoelectric generators, or the like or a combination thereof. Upon having sufficient stored-energy, the sensor assembly can sense a condition and/or transmit a signal. In one embodiment, a signal can be transmitted from the sensor assembly periodically (e.g., every five minutes).

As described above, a sensor assembly can include a single sensor (e.g., sensor 50) operatively coupled to a transmitter 52. In other embodiments, however, a sensor assembly can include a multiple sensors operatively coupled to the same transmitter. In yet another embodiment, more than one sensor assembly may be provided, each of which including a transmitter emitting a signal within different secondary fluid passageways. Sensor assemblies (or components thereof) can apply simplex or duplex communication techniques. In still another embodiment, more than one sensor assembly may be provided, each of which including a transmitter emitting a signal within a common secondary fluid passageway. For example, with reference to FIG. 3, another sensor assembly (e.g., herein referred to as a "second sensor assembly") including a sensor 62, a probe 64 projecting into the sump housing 42 and a transmitter 66 may be provided in addition to the sensor assembly including the sensor 50 and transmitter 52 (e.g., herein referred to as a "first sensor assembly").

In one embodiment, the second sensor assembly can be operable to sense a condition different from the condition sensed by the first sensor assembly. For example, the second sensor assembly can sense a temperature of the lubricant in the sump housing 42. The transmitter 66 can be operable to emit a signal corresponding to the condition of the temperature of lubricant in the sump housing 42. In one embodiment, the frequencies with which signals are emitted by the transmitters 52 and 66 can be different. In one embodiment, the frequencies of signals emitted by the transmitters 52 and 66 can be integer multipliers of one another. Accordingly, the second fluid passageway 44 can be configured to function as a waveguide for signals transmitted by both transmitters 52 and 66.

Many different embodiments in the present application are envisioned. For example, a first embodiment of the present invention is directed to an engine. The engine may include a first fluid passageway having an inlet and an outlet; at least one combustion chamber positioned along said first fluid passageway between said inlet and said outlet, wherein a primary fluid stream passes through said first fluid passageway and said at least one combustion chamber for generating power; a second fluid passageway at least partially distinct from said first fluid passageway, wherein a secondary fluid stream passes through said second fluid passageway to support the generation of power; a sensor assembly having a sensor operable to sense at least one condition and a transmitter associated with said sensor and operable to emit a signal corresponding to the at least one condition wirelessly, wherein at least part of said transmitter is positioned in said second fluid passageway to transmit the signal through said second fluid passageway; and a receiver operable to receive the signal and positioned in the second fluid passageway.

In the first embodiment, the sensor assembly can be further defined as being operable to emit the signal at a substantially optimized frequency relative to a cross-section of said second fluid passageway such that said second fluid passageway functions as a waveguide.

In the first embodiment, the second fluid passageway can extend along a torturous path.

In the first embodiment, the second fluid passageway can define a length and is a substantially constant cross-section along at least part of said length.

In the first embodiment, the at least one sensed condition is independent of the second fluid stream.

In the first embodiment, the sensor assembly is substantially encased in a structure formed of conductive material.

In the first embodiment, the sensor assembly is further defined as being operable to scavenge energy.

In the first embodiment, the second fluid passageway can be one of a lubricant passageway, a coolant passageway, and a fuel passageway.

A second embodiment of the present invention is directed to a method of operating a turbine engine. The method can include directing a first fluid stream through a core of the engine to generate power; passing a second fluid stream through a fluid passageway at least partially distinct from the core of the engine to support the generation of power during said directing; sensing at least one condition within the turbine engine with a sensor; transmitting a signal corresponding to the at least one condition wirelessly with a transmitter associated with the sensor; positioning the transmitter to transmit the signal through the fluid passageway; and locating a receiver to receive the signal in the fluid passageway.

In the second embodiment, the method can further include selecting the frequency of the signal based on the shape of the fluid passageway such that the fluid passageway functions as a waveguide.

In the second embodiment, the sensing may include detecting a condition unaffected by the second fluid stream.

In the second embodiment, the method may further include substantially encircling the transmitter with a structure formed of conductive material.

In the second embodiment, the method may further include scavenging energy from within the turbine engine to power the sensor.

In the second embodiment, the passing may include passing a second fluid stream of one of lubricant, coolant or fuel through the fluid passageway such that the sign emitted by the transmitter passes through the one of lubricant, coolant or fuel to reach the receiver.

A third embodiment of the present invention is directed to a turbine engine. The turbine engine can include a first fluid passageway operable to direct a first fluid stream through a compressor section, a combustor section and a turbine section to generate power; a second fluid passageway at least partially distinct from the first fluid passageway, wherein a secondary fluid stream passes through the second fluid passageway to support the generation of power; at least one sensor assembly having a sensor operable to sense at least one condition and a transmitter associated with the sensor and operable to emit a signal corresponding to the at least one condition wirelessly, wherein at least part of the transmitter is positioned in the second fluid passageway to transmit the signal through the second fluid passageway; and a receiver operable to receive the signal and positioned in the second fluid passageway.

In the third embodiment, the second fluid passageway can extend axially and radially relative to a centerline axis of the turbine engine.

In the third embodiment, the second fluid passageway can have a substantially constant cross-section.

In the third embodiment, a cross-section of the second fluid passageway is configured such that the second fluid passageway operates as a waveguide for the signal.

In the third embodiment, the at least one condition sensed by the sensor is not a condition of the second fluid stream.

In the third embodiment, the at least one sensor assembly may include a first sensor assembly having a first sensor operable to sense a first condition and a first transmitter associated with the first sensor and operable to emit a first signal corresponding to the first condition wirelessly at a first frequency, wherein at least part of the first transmitter is positioned in the second fluid passageway to transmit the first signal through the second fluid passageway; and a second sensor assembly having a second sensor operable to sense a second condition different than the first condition and a second transmitter associated with the second sensor and operable to emit a second signal corresponding to the second condition wirelessly at a second frequency different than the first frequency, wherein at least part of the second transmitter is positioned in the second fluid passageway to transmit the signal through the second fluid passageway, and wherein the first and second frequencies are integer multipliers of one another.

A fourth embodiment of the present invention is directed to a sensor communication system. The sensor communication system may include an electromagnetic waveguide disposed adjacent to at least one component of a machine, the electromagnetic waveguide being configured to convey a fluid within the machine; a sensor assembly including: a sensor operable to sense at least one condition; and a transmitter at least partially positioned in the electromagnetic waveguide, the transmitter being operatively coupled to the sensor and operable to emit a signal corresponding to the at least one condition; and a receiver at least partially positioned in the electromagnetic waveguide, the receiver being operable to wirelessly receive the signal.

In the fourth embodiment, wherein the machine is a turbine engine.

In the fourth embodiment, the sensor is operable to sense at least one condition of the machine.

In the fourth embodiment, the sensor is operable to sense at least one condition of the fluid.

In the fourth embodiment, the sensor communication system may further include a fluid source in fluid communication with the electromagnetic waveguide, wherein the electromagnetic waveguide is configured to convey the fluid from the fluid source.

In the fourth embodiment, the fluid may include a fluid selected from the group consisting of a lubricant, a fuel and a coolant.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A turbine engine comprising:
a first fluid passageway having an inlet and an outlet;
at least one combustion chamber positioned along said first fluid passageway between said inlet and said outlet, wherein a primary fluid stream passes through said first fluid passageway and said at least one combustion chamber for generating power;
a second fluid passageway at least partially distinct from said first fluid passageway, wherein a secondary fluid stream passes through said second fluid passageway to support the generation of power, and the second fluid passageway is further defined as being one of a lubricant passageway and a fuel passageway;
a sensor assembly having a sensor operable to sense at least one condition and a transmitter associated with said sensor and operable to emit a signal corresponding to the at least one condition wirelessly, wherein at least part of said transmitter is positioned in said second fluid passageway to transmit the signal through said second fluid passageway; and
a receiver operable to receive the signal and positioned in the second fluid passageway, wherein the sensor assembly and receiver are separate components separated by a portion of the second fluid passageway that includes at least one turn;
wherein said sensor assembly is further defined as being operable to emit the signal at a substantially optimized frequency relative to a cross-section of said second fluid passageway such that said second fluid passageway functions as a waveguide.

2. The turbine engine of claim 1 wherein said second fluid passageway extends along a tortuous path.

3. The turbine engine of claim 1 wherein said second fluid passageway defines a length and is a substantially constant cross-section along at least part of said length.

4. The turbine engine of claim 1 wherein the at least one condition is independent of the second fluid stream.

5. The turbine engine of claim 1 wherein said sensor assembly is substantially encased in a structure formed of conductive material.

6. The turbine engine of claim 1 wherein said sensor assembly is further defined as being operable to scavenge energy.

7. A turbine engine comprising:
a first fluid passageway having an inlet and an outlet;
at least one combustion chamber positioned along said first fluid passageway between said inlet and said outlet, wherein a primary fluid stream passes through said first fluid passageway and said at least one combustion chamber for generating power;
a second fluid passageway at least partially distinct from said first fluid passageway, wherein a secondary fluid stream passes through said second fluid passageway to support the generation of power, and the second fluid passageway is further defined as being one of a lubricant passageway and a fuel passageway, such that the second fluid passageway functions as a waveguide;
a sensor assembly having a sensor operable to sense at least one condition and a transmitter associated with said sensor and operable to emit a signal corresponding to the at least one condition wirelessly, wherein at least part of said transmitter is positioned in said second fluid passageway to transmit the signal through said second fluid passageway; and
a receiver operable to receive the signal and positioned in the second fluid passageway, wherein the sensor assembly and receiver are separate components separated by a portion of the second fluid passageway that includes at least one turn;
wherein said sensor assembly is substantially encased in a structure formed of conductive material;
wherein the sensor assembly is further defined as being operable to scavenge energy, and includes one or more of a thermal-electric converter, a micro-generator, a thermal-electric generator, or a piezoelectric generator, configured to scavenge energy.

8. The turbine engine of claim 7 wherein said second fluid passageway extends along a tortuous path.

9. The turbine engine of claim 7 wherein said second fluid passageway defines a length and is a substantially constant cross-section along at least part of said length.

10. The turbine engine of claim 7 wherein the at least one condition is independent of the second fluid stream.

11. A turbine engine comprising:

a first fluid passageway having an inlet and an outlet;

at least one combustion chamber positioned along said first fluid passageway between said inlet and said outlet, wherein a primary fluid stream passes through said first fluid passageway and said at least one combustion chamber for generating power;

a second fluid passageway at least partially distinct from said first fluid passageway, wherein a secondary fluid stream passes through said second fluid passageway to support the generation of power;

a sensor assembly having a sensor operable to sense at least one condition and a transmitter associated with said sensor and operable to emit a signal corresponding to the at least one condition wirelessly, wherein at least part of said transmitter is positioned in said second fluid passageway to transmit the signal through said second fluid passageway; and a receiver operable to receive the signal and positioned in the second fluid passageway, wherein the sensor assembly and receiver are separate components separated by a portion of the second fluid passageway that includes at least one turn;

wherein said second fluid passageway is further defined as being one of a lubricant passageway, and a fuel passageway.

12. The turbine engine of claim 11 wherein said second fluid passageway extends along a tortuous path.

13. The turbine engine of claim 11 wherein said second fluid passageway defines a length and is a substantially constant cross-section along at least part of said length.

14. The turbine engine of claim 11 wherein the at least one condition is independent of the second fluid stream.

15. The turbine engine of claim 11 wherein said sensor assembly is further defined as being operable to scavenge energy.

* * * * *